US012398495B1

(12) United States Patent
Lefebvre et al.

(10) Patent No.: US 12,398,495 B1
(45) Date of Patent: Aug. 26, 2025

(54) WEAVING LOOM WITH TILTABLE REED AND WEAVING METHOD

(71) Applicants: SAFRAN CERAMICS, Le Haillan (FR); SAFRAN, Paris (FR)

(72) Inventors: Marie Lefebvre, Moissy-Cramayel (FR); Aline Planckeel, Moissy-Cramayel (FR); Dominique Marie Christian Coupe, Moissy-Cramayel (FR)

(73) Assignees: SAFRAN CERAMICS, Le Haillan (FR); SAFRAN, Paris (FR)

( * ) Notice: Subject to any disclaimer, the term of this patent is extended or adjusted under 35 U.S.C. 154(b) by 0 days.

(21) Appl. No.: 18/877,067

(22) PCT Filed: Jun. 13, 2023

(86) PCT No.: PCT/FR2023/050854
§ 371 (c)(1),
(2) Date: Dec. 19, 2024

(87) PCT Pub. No.: WO2023/247859
PCT Pub. Date: Dec. 28, 2023

(30) Foreign Application Priority Data

Jun. 21, 2022 (FR) ..................... 2206080

(51) Int. Cl.
*D03D 49/62* (2006.01)
*D03D 13/00* (2006.01)
(Continued)

(52) U.S. Cl.
CPC ........... *D03D 49/62* (2013.01); *D03D 13/002* (2013.01); *D03D 25/005* (2013.01); *D10B 2505/02* (2013.01)

(58) Field of Classification Search
CPC .... D03D 49/62; D03D 13/002; D03D 25/005; D10B 2505/02
See application file for complete search history.

(56) References Cited

U.S. PATENT DOCUMENTS 498,191 A * 5/1893 Smith .................... D03D 51/28
139/353
1,330,917 A * 2/1920 Sinclair .................. D03D 39/02
139/21
(Continued)

FOREIGN PATENT DOCUMENTS

EP 0 310 847 A1 4/1989

OTHER PUBLICATIONS

International Preliminary Report on Patentability and the Written Opinion of the International Searching Authority as issued in International Patent Application No. PCT/FR2023/050854, dated Dec. 18, 2024.
(Continued)

*Primary Examiner* — Robert H Muromoto, Jr.
(74) *Attorney, Agent, or Firm* — Pillsbury Winthrop Shaw Pittman LLP (57) ABSTRACT

A Jacquard type loom intended to produce a fibrous structure by three-dimensional weaving between a plurality of warp yarns and a plurality of weft yarns extending in a horizontal direction, the loom including a reed movable between a rest position upstream of the rapier and a beat-up position of a fell of the fibrous structure in a beat-up direction parallel to the horizontal direction. The reed includes at least two stationary portions forming an angle therebetween. The reed is mounted on the loom by a positioning mechanism able to orient the reed about an axis of rotation so as to adjust an angular position of the stationary portions of the reed relative to a horizontal reference plane. The loom include
(Continued)

vertical translation elements able to move the reed or the fell of the fibrous structure in the vertical direction.

12 Claims, 6 Drawing Sheets

(51) Int. Cl.
    *D03D 25/00*     (2006.01)
    *D03D 41/00*     (2006.01)

(56) References Cited

U.S. PATENT DOCUMENTS

| | | | | |
|---|---|---|---|---|
| 1,612,439 A * | 12/1926 | Holmes | ................. | D03D 49/62 |
| | | | | 139/188 R |
| 1,683,216 A * | 9/1928 | Wakefield | ............. | D03D 49/62 |
| | | | | 139/188 R |
| 1,704,455 A * | 3/1929 | Alexander, Sr. | ....... | D03D 49/60 |
| | | | | 139/188 R |
| 1,926,383 A * | 9/1933 | Helmes | ................. | D03D 49/68 |
| | | | | 139/188 A |
| 2,025,879 A * | 12/1935 | McCleary | ............. | D03D 49/62 |
| | | | | 139/192 |
| 2,094,307 A * | 9/1937 | Shimwell | ............... | D03D 49/60 |
| | | | | 139/191 |
| 2,095,576 A * | 10/1937 | Shimwell | ............... | D03D 49/60 |
| | | | | 139/195 |
| 2,204,606 A * | 6/1940 | Lucas | .................... | D03D 47/00 |
| | | | | 139/440 |
| 3,132,671 A * | 5/1964 | Koppelman | ........... | D03D 49/62 |
| | | | | 139/192 |
| 3,425,459 A | 2/1969 | Volpe | | |
| 6,000,442 A * | 12/1999 | Busgen | ................ | D03D 41/004 |
| | | | | 428/36.1 |
| 8,733,406 B2 * | 5/2014 | Hannes | .................. | D03D 21/00 |
| | | | | 139/232 R |
| 9,200,385 B2 * | 12/2015 | Dambrine | ............. | D03D 41/00 |
| 10,519,576 B2 | 12/2019 | Marchal et al. | | |
| 2022/0111606 A1 * | 4/2022 | Marchal | .................. | B29C 70/48 |

OTHER PUBLICATIONS

International Search Report as issued in International Patent Application No. PCT/FR2023/050854, dated Sep. 25, 2023.

* cited by examiner

[Fig. 1]

PRIOR ART

WEAVING LOOM WITH TILTABLE REED AND WEAVING METHOD

CROSS-REFERENCE TO RELATED APPLICATIONS

This application is the U.S. National Stage of PCT/FR2023/050854, filed Jun. 13, 2023, which in turn claims priority to French patent application number 22 06080 filed Jun. 21, 2022. The content of these applications are incorporated herein by reference in their entireties.

TECHNICAL FIELD

The present invention relates to a Jacquard type loom and to the production of composite material parts and more particularly the production by three-dimensional (3D) weaving of fibrous reinforcement structures for such parts.

PRIOR ART

A field of application of the invention is the production of parts made of structural composite material, i.e. structural parts with fibrous reinforcement densified by a matrix, such as parts made of organic matrix composite material (OMC), carbon matrix composite material (C/C) and ceramic matrix composite material (CMC). The organic matrix composite material (OMC), carbon matrix composite material (C/C) and ceramic matrix composite material (CMC) replace the metal material parts in some portions of the turbomachines. Their use contributes to optimizing the performance of the aircrafts, in particular by improving the efficiency of the turbomachine and decreasing the overall mass of the turbomachine, which significantly reduces harmful emissions to the environment ($CO$, $CO_2$, $NOx$, etc.).

The invention more particularly relates to monitoring the direction of juxtaposition of the weft yarns in the columns of weft yarns during the weaving.

Figure 1:
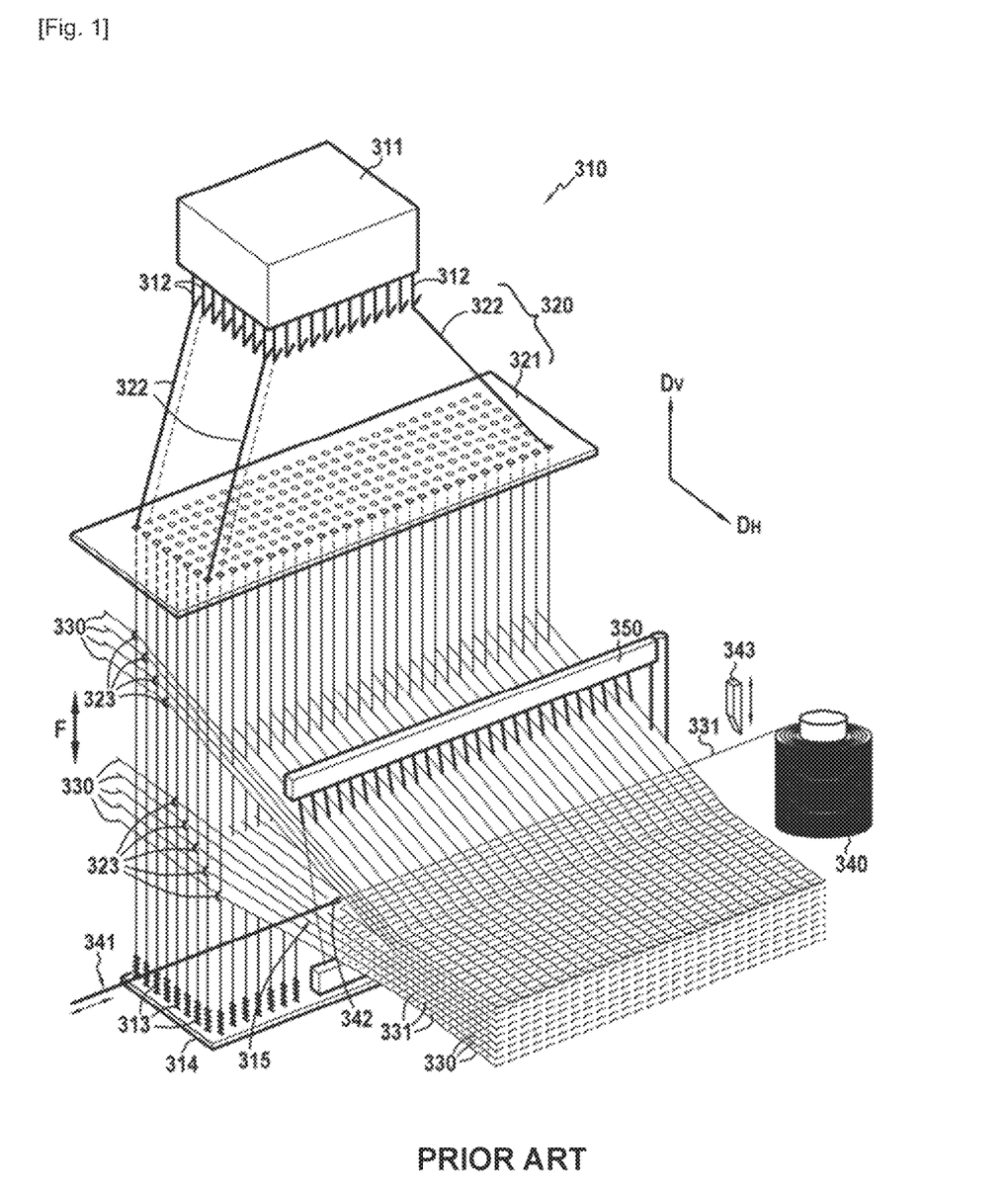
FIG. 1 is a schematic perspective view of a Jacquard-type loom according to the prior art.

FIG. 1 schematically illustrates a Jacquard type loom 310 used for the production of fibrous textures or fabric obtained by multilayer weaving between a plurality of layers of warp yarns 330 and a plurality of layers of weft yarns 331.

In a known manner, the loom 310 is equipped with a Jacquard mechanism 3311 supported by a superstructure not represented in FIG. 1. The loom 10 also comprises a harness 320 consisting of a tying-up board 321 and of control yarns or heddles 322, each heddle 322 being connected at one end to a control hook 12 of the Jacquard mechanism 311 and at the other end to one of the return springs 313 fixed to the frame 314 of the loom 310.

Each heddle 322 comprises an eyelet 323 crossed by a warp yarn 330. The heddles 322 and their associated eyelet 323 are driven by a substantially vertical oscillating movement represented by the double arrow F under the tensile forces exerted respectively by the control hooks 312 and the return springs 313. The heddles 322 make it possible to lift certain warp yarns 330 and thus create a shed 315, that is to say an opening between lower and upper webs of warp yarns 330 allowing the introduction of weft yarns 331 by means of a rapier 341. The rapier 341 is equipped at its end with a clamp 342 that grips a weft yarn 331 from a bobbin 340 to place it through the opening between the webs of warp yarns 330 created by the shed 315, the weft yarn 331 being cut using a knife 343 after its positioning in the shed 315.

A reed 350 present upstream of the rapier 341 in its rest position is then folded down in order to pack the weft yarn(s) introduced into the shed 315. The rapier 341 is then ready to again grip a new weft yarn 331 from the bobbin 40 and place it. A fibrous structure is thus gradually formed having a three-dimensional (3D) weaving between the warp yarns 330 and the weft yarns 31.

If this type of loom makes it possible to produce complex, i.e. 3D, weaving, all of the columns of weft yarns are oriented at 90° relative to a horizontal direction $D_H$. However, there is an advantage in being able to position the weft columns at an angle other than 90°, particularly to preposition the wefts before shaping the fibrous structure or to define specific mechanical properties in the final part.

DISCLOSURE OF THE INVENTION

For this purpose, the present invention proposes a Jacquard type loom intended to produce a fibrous structure by three-dimensional weaving between a plurality of warp yarns and a plurality of weft yarns extending in a horizontal direction, the loom comprising a plurality of control yarns able to move the warp yarns in a vertical direction, at least one rapier present downstream of the control yarns able to pull a weft yarn and a reed movable between a rest position upstream of the rapier and a beat-up position of a fell of the fibrous structure in a beat-up direction parallel to the horizontal direction, characterized in that the reed comprises at least two stationary portions forming an angle therebetween and in that the reed is mounted on the loom by means of a positioning mechanism able to at least orient the reed about an axis of rotation so as to adjust an angular position of said at least two stationary portions of the reed relative to a horizontal reference plane, the loom further comprising vertical translation means able to move the reed or the fell of the fibrous structure in the vertical direction so as to move said reed or said fell upwards or downwards relative to the horizontal reference plane.

In the loom of the invention, the angle with which the reed beats up the fell can be adjusted to a value other than 90° relative to a horizontal reference plane. It is thus possible to weave columns of weft yarns in which the weft yarns are juxtaposed in a layering direction not perpendicular to the horizontal reference plane. The inclination of the layering direction is monitored by the choice of the value of the beat-up angle of the reed.

According to one particular characteristic of the loom of the invention, the angle formed between said at least two stationary portions is comprised between 60° and 80°, more preferably an angle of about 70°.

The invention also relates to a method for three-dimensional weaving in a single piece of a fibrous structure between a plurality of layers of warp yarns and a plurality of layers of weft yarns, the weaving being performed by a loom according to the invention, the warp yarns extending in a horizontal direction corresponding to the direction of advance of said warp yarns, the weft yarns extending in a transverse direction, the weft yarns being woven in a plurality of columns spaced from each other in the horizontal direction, each column of weft yarns being positioned by the reed of the loom against the fell of the fibrous structure, the weft yarns of each column of weft yarns being juxtaposed in the thickness of the fibrous structure in a determined layering direction, the method comprising the weaving of at least one section with inclined weft columns in the fibrous structure, the weft yarns of the columns of weft yarns of said at least one section with inclined weft columns being juxtaposed in at least one first layering direction not perpendicular to a horizontal reference plane.

A fibrous structure is thus formed comprising one or more deployment sections in which the weft yarns in the columns of weft yarns are juxtaposed in a layering direction forming an angle with the horizontal direction other than 90°.

According to one particular characteristic of the method of the invention, the weft yarns of the column of weft yarns of said at least one section with inclined weft columns are juxtaposed in different first and second layering directions.

A section of fibrous structure is thus formed with columns of weft yarns having a broken shape.

According to another particular characteristic of the method of the invention, said at least one section with inclined weft columns is interlinked by weaving to one or more adjacent sections of the fibrous structure, the weft yarns of the columns of weft yarns of the adjacent section(s) being juxtaposed in a layering direction perpendicular to the horizontal direction.

The section(s) with inclined weft columns may here correspond to one or more deployment sections which are folded during the shaping of the fibrous structure.

Thus, after the folding of the section(s) with inclined weft columns, the angular variation resulting from the shear forces exerted therein during their deployment causes the horizontal straightening of the weft yarn columns in these sections and prevents detachment in the fibrous structure at the level of the inner radius.

According to another particular characteristic of the method of the invention, the first layering direction in said at least one section with inclined weft columns forms an angle with the horizontal direction comprised between 60° and 80°, more preferably an angle of about 70°.

The invention also relates to a method for manufacturing a composite material part comprising:
  weaving a fibrous structure in accordance with the weaving method according to the invention,
  shaping the fibrous structure so as to obtain a fibrous preform,
  densifying the fibrous preform by a matrix.

The invention further relates to a fibrous structure having a three-dimensional weaving between a plurality of layers of warp yarns and a plurality of layers of weft yarns, the warp yarns extending in a horizontal direction, the weft yarns extending in a transverse direction, the structure comprising a plurality of columns of weft yarns spaced from each other in the horizontal direction, the weft yarns of each column of weft yarns being juxtaposed in the thickness of the fibrous structure in a determined layering direction, the fibrous structure comprising at least one section with inclined weft columns, the weft yarns of the columns of weft yarns of said at least one section with inclined weft columns being juxtaposed in at least one first layering direction not perpendicular to the horizontal direction.

According to one particular characteristic of the fibrous structure of the invention, the weft yarns of the columns of weft yarns of said at least one section with inclined weft columns are juxtaposed in different first and second layering directions. The fibrous structure thus includes one or more sections with weft yarn columns having a broken shape.

According to another particular characteristic of the fibrous structure of the invention, said at least one section with inclined weft columns is interlinked by weaving to one or more adjacent sections of the fibrous structure, the weft yarns of the columns of weft yarns of the adjacent section(s) being juxtaposed in a layering direction perpendicular to the horizontal direction.

According to another particular characteristic of the fibrous structure of the invention, the first layering direction in said at least one section with inclined weft columns forms an angle with the horizontal direction comprised between 60° and 80°, more preferably an angle of about 70°.

The invention also relates to a composite material part comprising a fibrous reinforcement densified by a matrix, characterized in that the fibrous reinforcement comprises a fibrous structure according to the invention.

DESCRIPTION OF THE EMBODIMENTS

The invention generally applies to Jacquard type looms used in particular to produce fibrous structures or fabrics by three-dimensional (3D) weaving between layers of warp yarns and layers of weft yarns. The invention applies more particularly in the case of 3D weaving of fibrous structure with at least one section with inclined weft columns as explained in detail below. By "three-dimensional weaving" or "3D weaving" is meant here a weaving mode by which at least some of the weft yarns interlink warp yarns on several layers of warp yarns or vice versa. One example of three-dimensional weaving is called "interlock" weave. By "interlock" weaving is meant here a weave in which each layer of warp yarns interlinks several layers of weft yarns, with all of the yarns in the same warp column having the same movement in the weave plane. The yarns used here may in particular be carbon fiber yarns or ceramic fiber yarns such as silicon carbide (SiC) fibers, the invention not being limited to these types of yarns alone.

Figure 2:
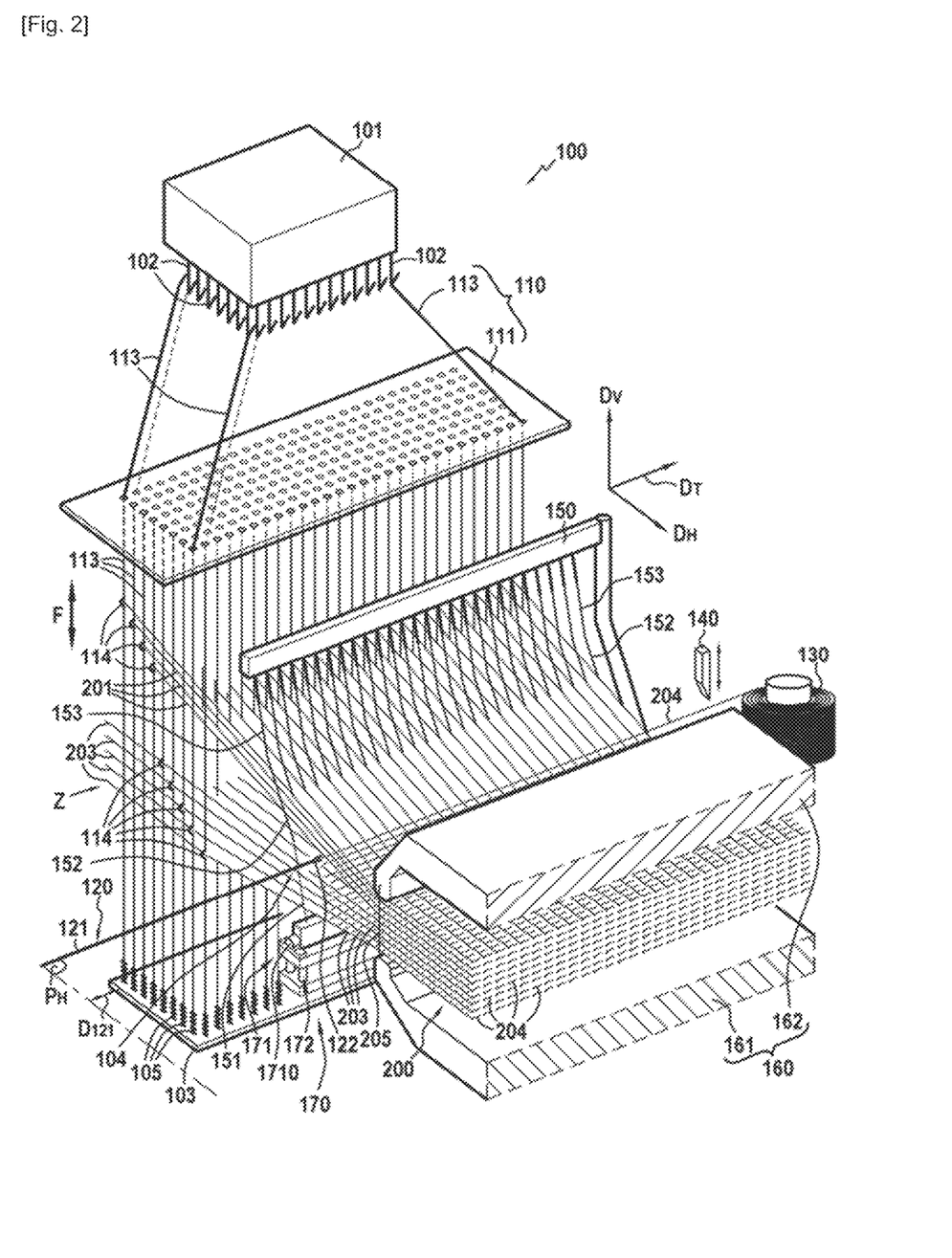
FIG. 2 is a schematic perspective view of a Jacquard-type loom according to one embodiment of the invention.

FIG. 2 illustrates a loom 100 in accordance with one embodiment of the invention. The loom 100 is equipped with a Jacquard mechanism 101 supported by a superstructure not represented in FIG. 3. The loom 100 also comprises a harness 110 consisting of a tying-up board 111 and control yarns or heddles 113, each heddle 113 being connected at one end to a control hook 102 of the Jacquard mechanism 101 and at the other end to one of the return springs 105 fixed to the frame 103 of the loom 100. Each heddle 113 comprises an eyelet 114 crossed by a warp yarn 203. The warp yarns 201 are organized at the level of the harness 110 of the loom in a plurality of layers and columns which are, as explained below, manipulated by the loom in order to allow the insertion of weft yarns 204 according to the weaving pattern(s) programmed in the loom. The warp yarns 203 extend in a horizontal direction $D_H$ corresponding to their direction of advance during the weaving. The weft yarns 204 are inserted between the warp yarns per column in a transverse direction DT perpendicular to the horizontal direction $D_H$. In order to allow the introduction of each column of weft yarns during the weaving of the fibrous structure, a warp yarn take-up system (not represented in FIG. 2) is associated with the loom. This system, placed downstream of the loom, has the role of holding all of the warp yarns together in a clamping device and of allowing the warp yarns to advance by a determined distance after the insertion of each weft column.

The heddles 113 and their associated eyelet 114 extend in an area Z in which the heddles 113 and the eyelets 114 are driven by a substantially vertical oscillating movement represented by the double arrow F. during the creation of a shed, as illustrated in FIG. 2, a portion of the heddles 113 is subjected to tensile forces exerted by the control hooks 102. In this configuration, the heddles 113 make it possible to lift some warp yarns 203 and thus create a shed 104 allowing the passage of a rapier 120 for the introduction of weft yarns 204.

The rapier 120, present downstream of the heddles 113, is composed of a rod 121, a first end of which is connected to an actuation system (not represented in FIG. 2) making it possible to reciprocate the rod 121 in the double direction $D_{121}$. The other end of the rod 121 is provided with a clamp 122 which, after having passed through the shed 104 during the forward path of the rod 121, grips a weft yarn 204 stored on a bobbin 130 to unwind it in the shed 104 during the return path of the rod 121. The weft yarn 204 thus placed inside the shed 104 is cut in the vicinity of the bobbin 130 by a knife 140 and released at its other end by the clamp 122.

A reed 150 present upstream of the rapier 120 in its rest position is then folded down in order to pack the weft yarn(s) introduced into the shed 104 against the fell 205 of a fibrous structure 200. The rapier 120 is then ready to again grip a new weft yarn 204 from the bobbin 130 and place it either again in the shed 104 or in a different shed depending on the defined weaving. A fibrous structure 200 having a 3D weaving between the warp yarns 203 and the weft yarns 204 is thus gradually formed.

In accordance with the invention, the direction of layering of the weft yarns in each weft column is adjusted with the reed 150. Indeed, the angle with which the reed beats up the weft yarns against the fell 205 of the fibrous structure 200 determines the direction of layering of the weft yarns in each column of weft yarns. For this purpose, in the present invention, the loom is equipped with a reed comprising at least two stationary portions forming an angle therebetween, the reed being orientable in order to set the beat-up angle thereof on the fell of the woven fibrous structure as a function of the layering direction to be obtained in each column of weft yarns. The beat-up direction of the reed is parallel to the horizontal direction $D_H$. The vertical position of the reed relative to the fibrous structure is further adjustable in order to position one or more stationary portions of the reed facing the fell of the fibrous structure.

In the example described here, the reed 150 successively comprises first, second and third stationary portions 151, 152 and 153 forming an angle therebetween, the first and second stationary portions 151 and 152 forming an angle $\alpha_1$ therebetween while the second and third stationary portions 152 and 153 form an angle $\alpha_2$ therebetween (FIGS. 3 to 6).

The reed 150 is mounted on the loom by means of a positioning mechanism 170 secured for example to the frame 103. The mechanism 170 comprises an angular adjustment device 171 comprising an axis of rotation or ball joint 1710 to which the lower end of the stationary portion 151 of the reed is connected here.

The loom according to the invention also comprises means for vertically translating the reed or the fell of the fibrous structure.

Concerning the vertical translation of the reed, the positioning mechanism 170 further comprises a vertical translation device 172 on which the angular adjustment device 171 is mounted, the vertical translation device 172 being secured to the frame 103 of the loom. The device 172 makes it possible to move the reed 150 upwards or downwards relative to a horizontal reference plane $P_H$. The horizontal reference plane $P_H$ corresponds to the middle portion of the fell 205 of the fibrous structure in the vertical direction $D_V$.

Concerning the vertical translation of the fell of the fibrous structure, the loom further comprises a holding device 160 comprising a lower jaw 161 and an upper jaw 162 each connected to an actuation means (not represented in FIG. 2) which is able to hold the woven structure 200 on the one hand, and to move the jaws 160 and 161 in the vertical direction $D_V$ on the other hand. The holding device 160 makes it possible to move the fell 205 of the woven structure in the vertical direction $D_V$ upwards or downwards relative to the horizontal reference plane $P_H$.

The positioning mechanism 170 is thus able to orient the reed about the axis of rotation 1710 so as to adjust an angular position of the first, second and third stationary portions 151, 152 and 153 of the reed 150 relative to the horizontal reference plane $P_H$ and to move the reed or the fell of the fibrous structure in the vertical direction $D_V$ so as to move said reed upwards or downwards relative to the horizontal reference plane $P_H$.

The reed 150 and/or the positioning mechanism 160 are mounted on a beat-up mechanism (not represented in FIG. 2) making it possible to beat up the fell 205 of the fibrous structure in a beat-up direction $D_F$ parallel to the horizontal direction $D_H$.

Thus, during the weaving of each section of a fibrous structure, the angular and vertical positions of the reed relative to the fell of the fibrous structure are adjusted so that one or more stationary portions of the reed beat up the fell of the fibrous structure at one or more determined angles.

Several examples of 3D weaving with the loom 100 according to the invention are now described.

Figure 3:
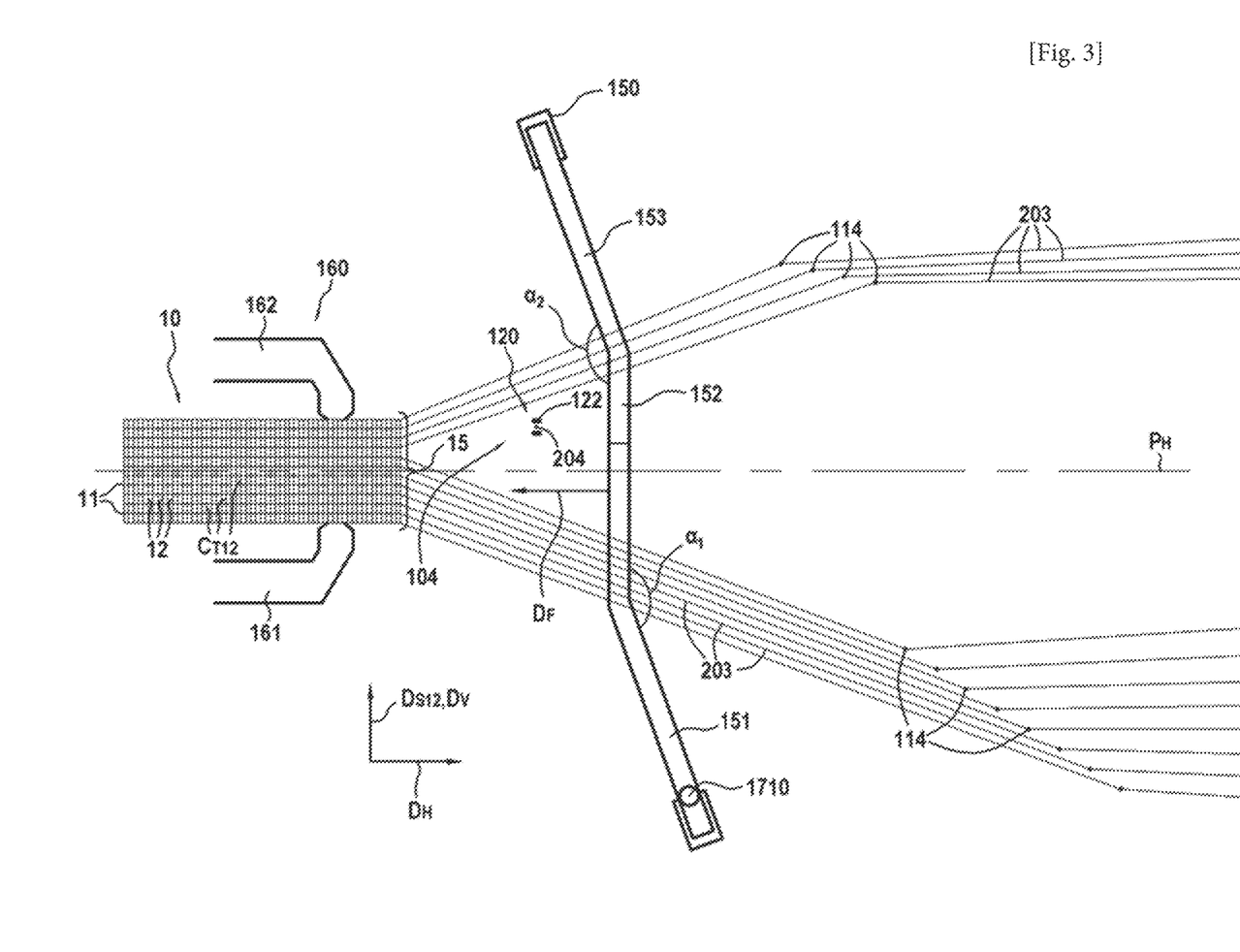
FIG. 3 is a side view of the loom of FIG. 2 showing the weaving of a section of fibrous structure with weft yarn columns perpendicular to a horizontal reference plane.

FIG. 3 shows the weaving of a section 10 of fibrous structure by 3D weaving between a plurality of layers of warp yarns 11 and a plurality of layers of weft yarns 12. The weft yarns are woven in the section 10 in a plurality of columns $C_{T12}$ spaced from each other in the horizontal direction $D_H$. The weft yarns of each column of weft yarns $C_{T12}$ are juxtaposed in the thickness of the section 10 of fibrous structure in a determined layering direction $D_{S12}$ perpendicular to the horizontal reference plane $P_H$.

During the weaving of the section 10, the reed 150 is oriented about its axis of rotation 1710 so that the second stationary portion 152 is perpendicular to the horizontal reference plane $P_H$. The reed 150 or the fell 15 of the section 10 of fibrous structure is positioned in the vertical direction $D_V$ so that the second stationary portion 152 is facing the fell 15. Thus, each time the reed 150 beats up the fell 15 in the beat-up direction $D_F$, the weft yarns of the section 10 are juxtaposed in each column of weft yarns in the layering direction $D_{S10}$ which is perpendicular to the horizontal direction $D_H$.

Figure 4:
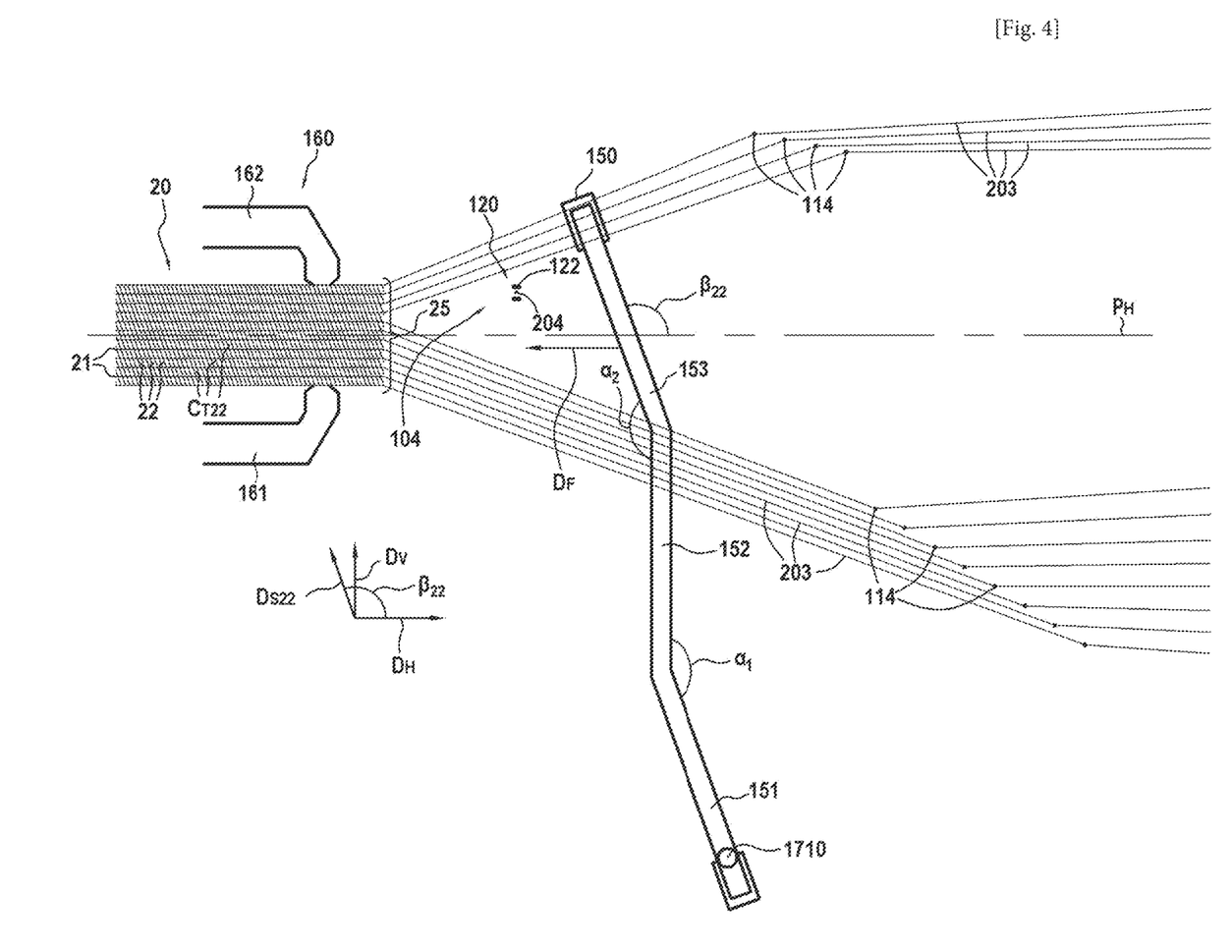
FIG. 4 is a side view of the loom of FIG. 2 showing the weaving of a section of fibrous structure with inclined weft yarn columns in a layering direction.

FIG. 4 shows the weaving of a section 20 of fibrous structure by 3D weaving between a plurality of layers of warp yarns 21 and a plurality of layers of weft yarns 22. The weft yarns are woven in the section 20 in a plurality of columns $C_{T22}$ spaced from each other in the horizontal direction $D_H$. The weft yarns 22 of each column of weft yarns $C_{T22}$ of the section 20 are juxtaposed against the fell 25 of the section 20 of fibrous structure in a layering direction $D_{S22}$ not perpendicular to the horizontal reference plane $P_H$.

During the weaving of the section 20 of fibrous structure, the reed 150 is oriented about its axis of rotation 1710 so that the third stationary portion 153 forms an angle $\beta_{22}$ with the horizontal reference plane $P_H$ which is greater than 90°. The reed 150 or the fell 25 is positioned in the vertical direction $D_V$ so that the third stationary portion 153 is facing the fell 25. Thus, each time the reed 150 beats up in the beat-up direction $D_F$, the weft yarns of the section 20 are juxtaposed in each column of weft yarns in the layering direction $D_{S22}$ forming the angle $\beta_{22}$ with the horizontal reference plane $P_H$.

Figure 5:
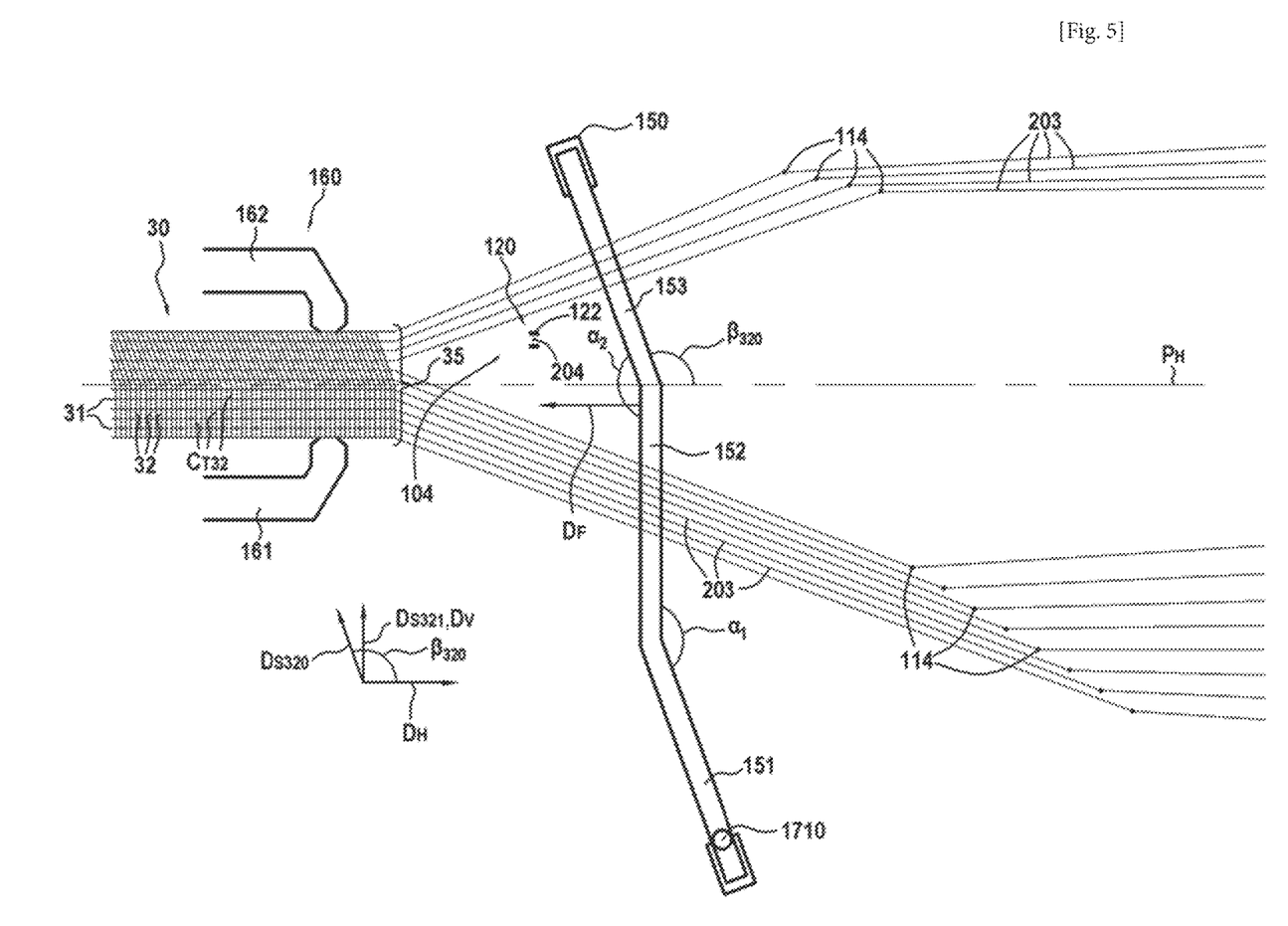
FIG. 5 is a side view of the loom of FIG. 2 showing the weaving of a section of fibrous structure with inclined weft yarn columns in two different layering directions.

FIG. 5 shows the weaving of a section 30 of fibrous structure by 3D weaving between a plurality of layers of warp yarns 31 and a plurality of layers of weft yarns 32. The weft yarns are woven in the section 30 in a plurality of columns $C_{T32}$ spaced from each other in the horizontal direction $D_H$. The weft yarns 32 of each column of weft yarns $C_{T32}$ of the section 30 are juxtaposed against the fell 35 of the section 30 of fibrous structure in a first layering direction $D_{S320}$ not perpendicular to the horizontal reference plane $P_H$ and a second layering direction $D_{S321}$ perpendicular to the horizontal reference plane $P_H$.

During the weaving of the section 30 of fibrous structure, the reed 150 is oriented about its axis of rotation 1710 so that the first stationary portion 151 forms an angle $\beta_{320}$ with the horizontal reference plane $P_H$ which is greater than 90° and so that the second stationary portion 152 forms an angle of 90° with the horizontal reference plane $P_H$. The reed 150 or the fell 35 is positioned in the vertical direction $D_V$ so that a section of the first stationary portion 151 is facing a lower portion of the fell 35 and so that a section of the second stationary portion 152 is facing an upper portion of the fell 35. Thus, each time the reed 150 beats up in the beat-up direction $D_F$, the weft yarns of the section 30 are juxtaposed in each column of weft yarns in the first layering direction $D_{S320}$ forming the angle $\beta_{320}$ with the horizontal reference plane $P_H$ and in the second layering direction $D_{S321}$ perpendicular to the horizontal reference plane $P_H$. A section of fibrous structure with columns of weft yarns having a broken shape is thus obtained.

Figure 6:
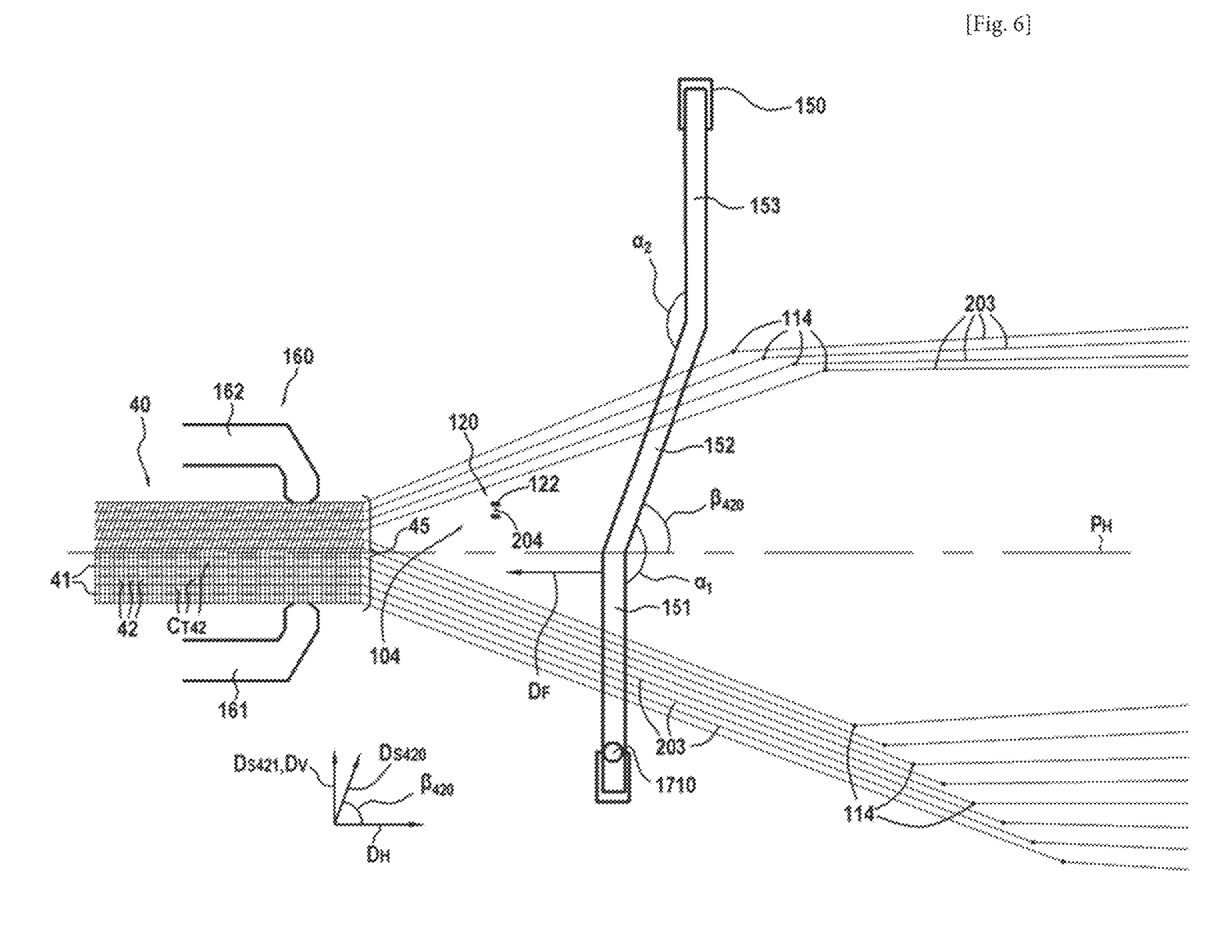
FIG. 6 is a side view of the loom of FIG. 2 showing the weaving of a section of fibrous structure with inclined weft yarn columns in two different layering directions.

FIG. 6 shows the weaving of a section 40 of fibrous structure by 3D weaving between a plurality of layers of warp yarns 41 and a plurality of layers of weft yarns 42. The weft yarns are woven in the section 40 in a plurality of columns $C_{T42}$ spaced from each other in the horizontal direction $D_H$. The weft yarns 42 of each column of weft yarns $C_{T42}$ of the section 40 are juxtaposed against the fell 45 of the section 40 of fibrous structure in a first layering direction $D_{S420}$ not perpendicular to the horizontal reference plane $P_H$ and a second layering direction $D_{S421}$ perpendicular to the horizontal reference plane $P_H$.

During the weaving of the section 40 of fibrous structure, the reed 150 is oriented about its axis of rotation 1710 so that the second stationary portion 152 forms an angle $\beta_{420}$ with the horizontal reference plane $P_H$ which is less than 90° and so that the third stationary portion 153 forms an angle of 90° with the horizontal reference plane $P_H$. The reed 150 or the fell 45 is positioned in the vertical direction $D_V$ so that a section of the second stationary portion 152 is facing a lower portion of the fell 45 and so that a section of the third stationary portion 153 is facing an upper portion of the fell 45. Thus, each time the reed 150 beat up in the beat-up direction $D_F$, the weft yarns of the section 40 are juxtaposed in each column of weft yarns in the first layering direction $D_{S420}$ forming the angle $\beta_{420}$ with the horizontal reference plane $P_H$ and in the second layering direction $D_{S421}$ perpendicular to the horizontal reference plane $P_H$. A section of fibrous structure with columns of weft yarns having a broken shape is thus obtained.

A fibrous structure in accordance with the invention, i.e. including a section with inclined or broken weft columns as described above, can be used as fibrous reinforcement for a composite material part. For this purpose, after possible shaping of the fibrous structure, the fibrous structure or preform is densified in order to form a composite material part. The densification of the fibrous preform intended to form the fibrous reinforcement of the part to be manufactured consists in filling the porosity of the preform, in all or part of its volume, with the material constituting the matrix. This densification can be performed in a manner known per se using the liquid process (CVL) or the gas process (CVI), or the ceramic filler injection process (Slurry Cast) or the silicon alloy impregnation process (MI or RMI) or using a sequence of one or more of these processes.

The liquid process consists in impregnating the preform with a liquid composition containing a precursor of the matrix material. The precursor is usually in the form of a polymer, such as a high-performance epoxy resin, optionally diluted in a solvent. The preform is placed in a mold that can be tightly closed with a housing having the shape of the final molded blade. Then, the mold is closed and the liquid matrix precursor (for example a resin) is injected into the entire housing to impregnate the entire fibrous portion of the preform.

The transformation of the precursor into a matrix, namely its polymerization, is performed by heat treatment, generally by heating of the mold, after removal of any solvent and crosslinking of the polymer, the preform being always held in the mold having a shape corresponding to that of the part to be produced.

In the case of the formation of a carbon or ceramic matrix, the heat treatment consists in pyrolyzing the precursor to transform the matrix into a carbon or ceramic matrix depending on the precursor used and the pyrolysis conditions. For example, liquid precursors of ceramics, in particular of SiC or SiCN, can be resins of the polycarbosilane (PCS) or polytitanocarbosilane (PTCS) or polysilazane (PSZ) type, while liquid precursors of carbon can be resins with relatively high coke content, such as phenolic resins. Several consecutive cycles, from impregnation to heat treatment, can be performed to achieve the desired degree of densification.

In the case in particular of the formation of an organic matrix, the densification of the fibrous preform can be performed by the well-known transfer molding process called RTM (Resin Transfer Molding). In accordance with the RTM process, the fibrous preform is placed in a mold having the external shape of the part to be produced. A thermosetting resin is injected into the inner space of the mold which comprises the fibrous preform. A pressure gradient is generally established in this inner space between the place where the resin is injected and the discharge orifices of the latter in order to monitor and optimize the impregnation of the preform with the resin.

The densification of the preform can also be performed by polymer impregnation and pyrolysis (PIP), or by impregnation of a slurry cast, containing for example SiC and organic binders, followed by infiltration with liquid silicon (Melt infiltration).

The densification of the fibrous preform can also be performed, in a known manner, by gas process through chemical vapor infiltration (CVI) of the matrix. The fibrous preform corresponding to the fibrous reinforcement of the blade to be produced is placed in a furnace into which a reaction gas phase is admitted. The pressure and the temperature prevailing in the furnace and the composition of the gas phase are chosen so as to allow the diffusion of the gas phase within the porosity of the preform to form the matrix by deposition, at the core of the material in contact with the fibers, of a solid material resulting from a decomposition of a constituent of the gas phase or from a reaction between several constituents, unlike the pressure and temperature conditions specific to CVD (Chemical Vapor Deposition) processes which exclusively lead to a deposition on the surface of the material.

The formation of a SiC matrix can be obtained with methyltrichlorosilane (MTS) giving SiC by decomposition of the MTS while a carbon matrix can be obtained with hydrocarbon gases such as methane and/or propane giving carbon by cracking.

A densification combining liquid process and gas process can also be used to facilitate the implementation, limit the costs and the manufacturing cycles while obtaining satisfactory characteristics for the intended use.

The densification methods described above make it possible to produce, from the fibrous structure of the invention, mainly parts made of organic matrix composite material (OMC), carbon matrix composite material (C/C) and ceramic matrix composite material (CMC). The organic matrix composite material (OMC), carbon matrix composite material (C/C) and ceramic matrix composite material (CMC) replace the metal material parts in some portions of turbomachines. Their use contributes to optimizing the performance of the aircrafts, in particular by improving the efficiency of the turbomachine and decreasing the overall mass of the turbomachine, which significantly reduces harmful emissions to the environment ($CO$, $CO_2$, NOx, etc.).

After densification, a composite material part is obtained.

The fibrous structure and its manufacturing method according to the present invention can in particular be used to produce turbine ring sectors, stiffeners, turbomachine vanes or blades.

The invention claimed is:

1. A Jacquard type loom intended to produce a fibrous structure by three-dimensional weaving between a plurality of warp yarns and a plurality of weft yarns extending in a horizontal direction, the loom comprising a plurality of control yarns able to move the warp yarns in a vertical direction, at least one rapier present downstream of the control yarns able to pull a weft yarn and a reed movable between a rest position upstream of the rapier and a beat-up position of a fell of the fibrous structure in a beat-up direction parallel to the horizontal direction, wherein the reed comprises at least two stationary portions forming an angle therebetween and in that the reed is mounted on the loom by means of a positioning mechanism able to at least orient the reed about an axis of rotation so as to adjust an angular position of said at least two stationary portions of the reed relative to a horizontal reference plane, the loom further comprising vertical translation means able to move the reed or the fell of the fibrous structure in the vertical direction so as to move said reed or said fell upwards or downwards relative to the horizontal reference plane.

2. The loom according to claim 1, wherein the angle formed between said at least two stationary portions is comprised between 60° and 80°.

3. A method for three-dimensional weaving in a single piece of a fibrous structure between a plurality of layers of warp yarns and a plurality of layers of weft yarns, the weaving being performed by a loom according to claim 1, the warp yarns extending in a horizontal direction corresponding to the direction of advance of said warp yarns, the weft yarns extending in a transverse direction, the weft yarns being woven in a plurality of columns spaced from each other in the horizontal direction, each column of weft yarns being positioned by the reed of the loom against the fell of the fibrous structure, the weft yarns of each column of weft yarns being juxtaposed in the thickness of the fibrous structure in a determined layering direction, the method comprising the weaving of at least one section with inclined weft columns in the fibrous structure, the weft yarns of the column of weft yarns of said at least one section with inclined weft columns being juxtaposed in at least one first layering direction not perpendicular to a horizontal reference plane.

4. The method according to claim 3, wherein the weft yarns of the columns of weft yarns of said at least one section with inclined weft columns are juxtaposed in different first and second layering directions.

5. The method according to claim 3, wherein said at least one section with inclined weft columns is interlinked by weaving to one or more adjacent sections of the fibrous structure, the weft yarns of the columns of weft yarns of the adjacent section(s) being juxtaposed in a layering direction perpendicular to the horizontal direction.

6. The method according to claim 3, wherein the first layering direction in said at least one section with inclined weft columns forms an angle with the horizontal direction comprised between 60° and 80°.

7. A method for manufacturing a composite material part comprising:
   weaving a fibrous structure in accordance with the weaving method according to claim 3,
   shaping the fibrous structure so as to obtain a fibrous preform,
   densifying the fibrous preform by a matrix.

8. A fibrous structure obtained in accordance with the three-dimensional weaving method according to claim 3, the fibrous structure having a three-dimensional weaving between a plurality of layers of warp yarns and a plurality of layers of weft yarns, the warp yarns extending in a horizontal direction, the weft yarns extending in a transverse direction, the structure comprising a plurality of columns of weft yarns spaced from each other in the horizontal direction, the weft yarns of each column of weft yarns being juxtaposed in the thickness of the fibrous structure in a determined layering direction, the fibrous structure comprising at least one section with inclined weft columns, the weft yarns of the columns of weft yarns of said at least one section with inclined weft columns being juxtaposed in at least one first layering direction not perpendicular to the horizontal direction.

9. The structure according to claim 8, wherein the weft yarns of the columns of weft yarns of said at least one section with inclined weft columns are juxtaposed in different first and second layering directions.

10. The structure according to claim 8, wherein said at least one section with inclined weft columns is interlinked by weaving to one or more adjacent sections of the fibrous structure, the weft yarns of the columns of weft yarns of the adjacent section(s) being juxtaposed in a layering direction perpendicular to the horizontal direction.

11. The structure according to claim 8, wherein the first layering direction in said at least one section with inclined weft columns forms an angle with the horizontal direction comprised between 60° and 80°.

12. A composite material part comprising a fibrous reinforcement densified by a matrix, characterized in that the fibrous reinforcement comprises a fibrous structure according to claim 8.

* * * * *